(12) United States Patent
Warrick, II et al.

(10) Patent No.: US 11,580,339 B2
(45) Date of Patent: Feb. 14, 2023

(54) ARTIFICIAL INTELLIGENCE BASED FRAUD DETECTION SYSTEM

(71) Applicant: Oracle International Corporation, Redwood Shores, CA (US)

(72) Inventors: William M. Warrick, II, Blacklick, OH (US); Su-Ming Wu, Waltham, MA (US); Stephen Clegg, Accrington (GB); Randall Fernandes, Tiverton, RI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 620 days.

(21) Appl. No.: 16/682,147

(22) Filed: Nov. 13, 2019

(65) Prior Publication Data

US 2021/0142126 A1    May 13, 2021

(51) Int. Cl.
*G06K 9/62* (2022.01)
*G06F 16/28* (2019.01)
(Continued)

(52) U.S. Cl.
CPC ......... *G06K 9/6284* (2013.01); *G06F 16/287* (2019.01); *G06K 9/6231* (2013.01);
(Continued)

(58) Field of Classification Search
CPC .. G06K 9/6284; G06K 9/6231; G06K 9/6257; G06K 9/6264; G06K 9/6282;
(Continued)

(56) References Cited

U.S. PATENT DOCUMENTS

| 5,819,226 A | * | 10/1998 | Gopinathan | ......... G06Q 40/025 |
| | | | | 705/44 |
| 6,094,643 A | * | 7/2000 | Anderson | ............... G06Q 20/04 |
| | | | | 379/91.01 |

(Continued)

FOREIGN PATENT DOCUMENTS

| CA | 3028646 A1 | * | 6/2019 | ........... G06K 9/6223 |
| WO | WO-0248835 A2 | * | 6/2002 | ............. G06Q 20/04 |

(Continued)

OTHER PUBLICATIONS

Wu, "Reducing Retail Fraud with Machine Learning", Apr. 5, 2018, https://blogs.oracle.com/retail/reducing-retail-fraud-with-machine-learning.

*Primary Examiner* — Mahendra R Patel
(74) *Attorney, Agent, or Firm* — Potomac Law Group, PLLC

(57) ABSTRACT

Embodiments detect fraud of risk targets that include both customer accounts and cashiers. Embodiments receive historical point of sale ("POS") data and divide the POS data into store groupings. Embodiments create a first aggregation of the POS data corresponding to the customer accounts and a second aggregation of the POS data corresponding to the cashiers. Embodiments calculate first features corresponding to the customer accounts and second features corresponding to the cashiers. Embodiments filter the risk targets based on rules and separate the filtered risk targets into a plurality of data ranges. For each combination of store groupings and data ranges, embodiments train an unsupervised machine learning model. Embodiments then apply the unsupervised machine learning models after the training to generate first anomaly scores for each of the customer accounts and cashiers.

20 Claims, 6 Drawing Sheets

(51) Int. Cl.
*G06N 20/10* (2019.01)
*G06N 20/20* (2019.01)

(52) U.S. Cl.
CPC .......... *G06K 9/6257* (2013.01); *G06N 20/10* (2019.01); *G06N 20/20* (2019.01)

(58) Field of Classification Search
CPC .... G06K 9/6269; G06F 16/287; G06N 20/10; G06N 20/20; G06N 5/003; G06V 10/75; G06V 30/248
USPC .......................................................... 706/12
See application file for complete search history.

(56) References Cited

U.S. PATENT DOCUMENTS

| | | | | |
|---|---|---|---|---|
| 9,396,621 | B2 * | 7/2016 | Fan | G07G 1/0036 |
| 10,242,019 | B1 * | 3/2019 | Shan | G06Q 10/06 |
| | | | | 705/7.41 |
| 10,552,994 | B2 * | 2/2020 | Yousaf | G06T 11/206 |
| 2005/0262189 | A1 * | 11/2005 | Mamou | G06Q 10/10 |
| | | | | 709/203 |
| 2013/0027561 | A1 * | 1/2013 | Lee | G06Q 10/06 |
| | | | | 705/7.41 |
| 2014/0180826 | A1 * | 6/2014 | Boal | G06Q 20/209 |
| | | | | 705/14.66 |
| 2016/0012465 | A1 * | 1/2016 | Sharp | G06Q 20/321 |
| | | | | 705/14.17 |
| 2016/0078367 | A1 * | 3/2016 | Adjaoute | G06N 20/00 |
| | | | | 706/12 |
| 2019/0220863 | A1 * | 7/2019 | Novick | G06Q 20/10 |
| 2020/0065812 | A1 * | 2/2020 | Walters | G06F 9/451 |
| 2020/0184444 | A1 * | 6/2020 | Gu | G06Q 40/025 |
| | | | | 705/44 |
| 2020/0363920 | A1 * | 11/2020 | Ignatyev | G06F 9/451 |

FOREIGN PATENT DOCUMENTS

| | | | | |
|---|---|---|---|---|
| WO | WO-2004044808 | A1 * | 5/2004 | ........... G06Q 10/087 |
| WO | WO-2013019246 | A1 * | 2/2013 | ......... G06K 9/00302 |
| WO | WO-2018229293 | A1 * | 12/2018 | ........... G06F 17/153 |
| WO | WO-2019013771 | A1 * | 1/2019 | ........... G06F 21/552 |

* cited by examiner

Fig. 5

ARTIFICIAL INTELLIGENCE BASED FRAUD DETECTION SYSTEM

FIELD

One embodiment is directed generally to a computer system, and in particular to an artificial intelligence based computer system for fraud detection.

BACKGROUND INFORMATION

Known software-based solutions to fraud detection in many domains, including retail, generally use rule-based filters to flag suspicious activity which can then be later examined by human experts. However, this approach has several drawbacks. For one, it can flag a large amount of activity as fraud, frequently giving users too many risk targets to investigate and no way to decide which to investigate first. Detecting actual fraud will likely always require human intelligence for investigation, and so the role of the software is to identify risk targets requiring investigation. But such software becomes useless if the number of risk targets identified is too large.

Further, known solutions can miss new types of suspicious activity that are very different from what the rules are looking for. The rules describe known types of suspicious activity, but the cleverness of thieves is inexhaustible, and the ideal fraud detection system must have a way to adapt to their inventiveness without human aid. Further, the rules may require manual re-tuning when the business changes or when the environment changes. Therefore, an ideal fraud detection system would adapt without human aid.

SUMMARY

Embodiments detect fraud of risk targets that include both customer accounts and cashiers. Embodiments receive historical point of sale ("POS") data and divide the POS data into store groupings. Embodiments create a first aggregation of the POS data corresponding to the customer accounts and a second aggregation of the POS data corresponding to the cashiers. Embodiments calculate first features corresponding to the customer accounts and second features corresponding to the cashiers. Embodiments filter the risk targets based on rules and separate the filtered risk targets into a plurality of data ranges. For each combination of store groupings and data ranges, embodiments train an unsupervised machine learning model. Embodiments then apply the unsupervised machine learning models after the training to generate first anomaly scores for each of the customer accounts and cashiers.

BRIEF DESCRIPTION OF THE DRAWINGS

FIG. 5 is a screenshot of a user interface for cashier fraud detection in accordance to embodiments.

DETAILED DESCRIPTION

Embodiments employ machine-learning/artificial intelligence ("AI") techniques in combination with a rules-based system. Embodiments run the rules system over historical sales activity to mark those which are suspicious according to the rules. Embodiments train a 1-class support vector machine ("SVM") on the activity which has not been marked as suspicious by the rules. Embodiments then use the trained SVM to identify suspicious activity in historical data and in any incoming records of sales activity.

Therefore, in contrast with known solutions, in embodiments, the flagging of suspicious activity is no longer done by the rules, but only by the SVM. However, the rules are still used in preparing training data for the SVM by acting as filters. In addition to using the SVM to identify suspicious activity, embodiments simultaneously employ random forests machine learning to also identify suspicious activity.

Figure 1:
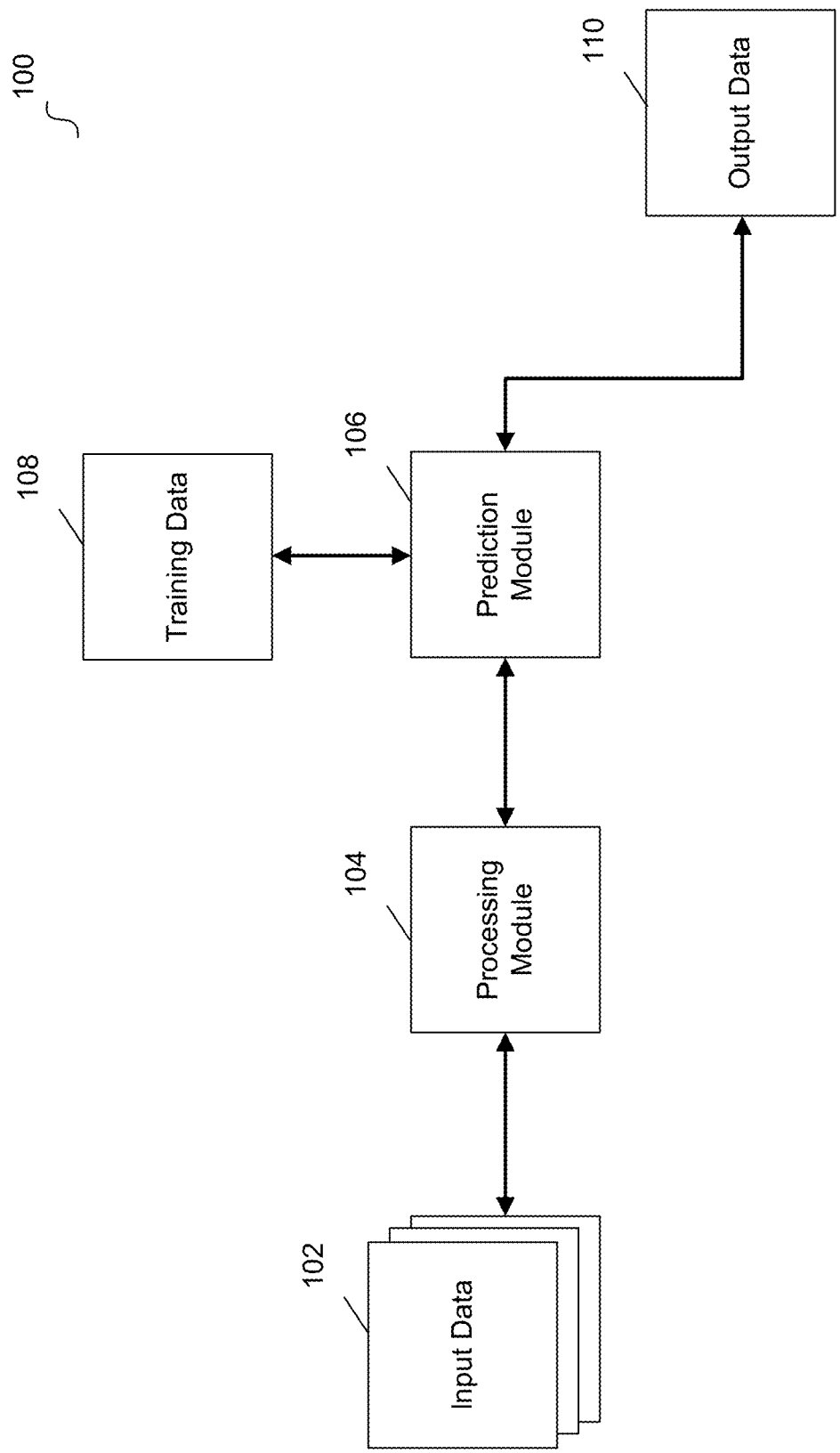
FIG. 1 illustrates a system for detecting fraud using artificial intelligence according to an example embodiment.

FIG. 1 illustrates a system for detecting fraud using artificial intelligence according to an example embodiment. System 100 includes input data 102, a processing model 104, a prediction module 106, training data 108, and output data 110. In some embodiments, input data 102 can include several elements or rows of data, and the data can be processed by processing module 104. For example, processing module 104 can generate metadata profiles based on input data 102. In some embodiments, the metadata profiles, not the input data itself, is fed to prediction module 106.

In some embodiments, prediction module 106 can be a machine learning module (e.g., neural network, SVM, random forests, etc.) that is trained by training data 108. For example, training data 108 can include labeled data, such as metadata profiles generated by processing labeled and/or structured data. In some embodiments, the output from processing module 104, such as the processed input data (e.g., metadata profiles), can be fed as input to prediction module 106. Prediction model 106 can generate output data 110, such as fraud detection in response to input data 102. In some embodiments, output 110 can be one or more fraud activity categories that can be used to organize and/or store input data 102 in a structured manner.

Figure 2:
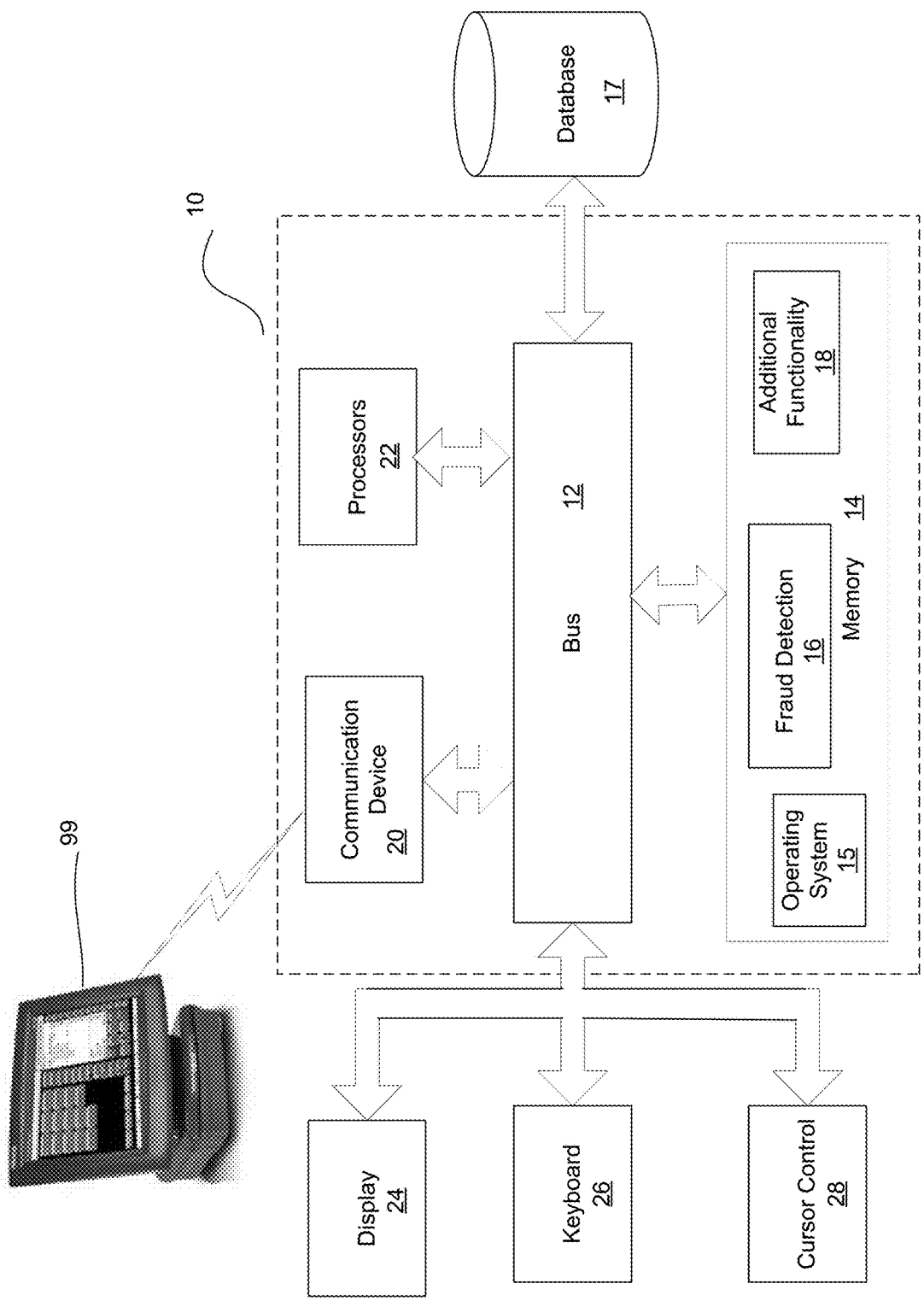
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can centrally provide the functionality for all or some of the components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a fraud detection module 16 that provides AI based fraud detection, and all other functionality disclosed herein. System 10 can be part of a larger system. Therefore, system 10 can include one or more additional functional modules 18 to include the additional functionality, such as a retail management system (e.g., the "Oracle Retail Offer Optimization Cloud Service" or the "Oracle Retail Advanced Science Engine" ("ORASE") from Oracle Corp.) a retail loss prevention service (e.g., "Oracle Retail XBR$^i$ Loss Prevention Cloud Service") or an enterprise resource planning ("ERP") system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 99 generates transactional data and historical sales data (e.g., data concerning transactions of each item/SKU at each retail store) used for AI based fraud detection. POS terminal 99 itself can include additional processing functionality to perform AI based fraud detection in accordance with one embodiment and can operate as a specialized AI based fraud detection either by itself or in conjunction with other components of FIG. 2.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As discussed, embodiments use AI to detect fraud in sales activity data that can be obtained from one or more POSs 99 (e.g., in a large chain, sales data can be obtained from hundreds or thousands of POSs 99). In general, sales activity data in embodiments includes two types:

Aggregate customer-account data. It is frequently possible to identify sets of sales transactions as being from the same customer, such as through the use of a customer loyalty account, and aggregating this data per customer provides a summary snapshot of the customer account at given point in time. It is these aggregates which are used in embodiments.

Aggregate cashier data. Almost all retailers have point-of-sale systems (e.g., POS 99) that allow for tracking the activity of each cashier, and here the aggregate data provides a summary snapshot of every cashier at a point in time.

Because it can be difficult even with machine learning techniques to determine whether any single solitary transaction is suspicious, embodiments utilize this aggregate approach, and flags customer accounts and cashiers for further investigation. Embodiments generate the above aggregations from the raw transactions data.

Embodiments apply suspicious-activity detection separately to the customer-account aggregates and to the cashier aggregates. Therefore, embodiments include two parallel machine-learning systems, one for handling customer accounts and another for handling cashiers. In the present disclosure, the term "risk target" applies to either or both of the customer accounts and the cashiers. In general, the customer-account aggregates will vastly outnumber the cashier aggregates, since the number of customers can be in the millions, while the number of cashiers might in the thousands.

In embodiments, the aggregations are created periodically, for example once per week, on the last 90 days of raw transactions data, where the 90 is a configuration parameter that can be changed, as is the frequency of performing the aggregations. Therefore, the aggregations provide the latest summaries of the risk targets, and so automatically adjust to changes in cashier or customer behavior. It could be that a customer account becomes suspicious, due to changes in the customer's activity, or for that matter, becomes less suspicious.

One embodiment implements a 1-class Support Vector Machine ("SVM") which is an unsupervised machine learning technique/model. "Unsupervised" refers to a machine-learning algorithm does not require feedback from users as to which risk targets were truly fraudulent. In contrast, "supervised" learning algorithms, such as random forests, require users to indicate which risk targets were truly fraudulent, from which the learning algorithm can then learn what constitutes a suspicious risk target. Both unsupervised and supervised techniques are commonly used when applying machine learning, but the advantage to unsupervised techniques is that they can work without relying on the presence or accuracy of user feedback. In the retail industry, it may be possible that users do not have the time to provide feedback, or that a particular retailer does not have the resources to investigate enough suspicious risk targets to provide accurate feedback. For such reasons, some embodiments include an unsupervised technique. In one embodiment, the 1-class SVM is implemented by "Oracle Advanced Analytics" that is part of the "Oracle Database".

Embodiments initially feed to the 1-class SVM the set of filtered risk targets, which as discussed above are filtered by rules. Removing as many known anomalous risk targets as possible from the training set increases the chances that the remainder of the training set does indeed represent normal behavior. This process is called "creating a model," and the set of risk targets used to create the 1-class SVM is the "training set."

After creating the model, embodiments run it on the set of all risk targets, not just the filtered ones. The 1-class SVM does not produce a binary, yes/no indication of suspicious risk targets, but rather an "anomaly score" between 0 and 100 indicating the degree of anomaly (with 100 meaning "extremely anomalous"). This anomaly-detection approach remedies some of the deficiencies of known rules-only approaches by:

1. Providing an anomaly score indicating how anomalous the risk target is, thus giving the user an indication of which risk targets should be examined first. This capability can be used in concert with rules, and allows the user to find the most suspicious risk targets within the suspicious activity identified by a particular rule via user interface ("UI") dashboards.

2. Assigning anomaly scores to risk targets not classified as suspicious by the rules, thus allowing the system to detect new types of fraud which the rules may not catch.

3. Periodic retraining of the anomaly detector allows it to accommodate changes in the retailer's business, such as if particular cashier activity became normal due to changes in the retailer's organization. The retrained models adapt themselves over time to this new normal, while rules-based approaches may require manual re-tuning.

Selection of Features

When applying any machine learning technique, including the 1-class SVM in embodiments, there is a need to decide which features to present to the model when the model is created or periodically re-trained. Specifically, embodiments select the most appropriate characteristics of a Risk Target (i.e., an Account or Cashier) that the model should use to detect anomalies. However, it is generally the skill of a Business Analyst and the Data Scientist, working in tandem that will ultimately determine whether the anomalies detected are accurate and represent a convincing case for fraud. In general, simply feeding raw data into a machine-learning algorithm will not cause perfect results to be outputted.

Embodiments select those characteristics that have been identified previously in manual investigations of fraud. In general, the machine learning algorithm will be replicating human investigation but learning from a human with prior knowledge and experience of the fraud investigation processes.

In the following, the term "amount" means a monetary value, such as a dollar value (or whatever currency has been chosen as the base currency). The term "count" means just a count of transactions. Embodiments use the following principles when selecting and constructing features and characteristics for either Risk Target (i.e., either customer account or cashier):

In general, the feature should not be an absolute count or absolute amount, but a ratio that compares two quantities. For example, using just total sales amount (dollar amounts) as a feature for accounts is probably not a good choice because the anomaly detector might then simply identify accounts with very high or very low sales amounts (or both) as anomalous. While it is possible that such accounts are indeed fraudulent, more likely the maximum and minimum simply represent the range of total sales amounts and only indicate customers who have bought a lot or a little from the retailer. Thus, instead of just total sales amount, embodiments instead use the total sales amount divided by sales transactions, to get an average amount per transaction. Because the ratio is doing a comparison of two quantities, anomalies in it will be more useful. The exact ratios used for accounts and for cashiers in embodiments is disclosed below.

Embodiments makes use of three types of ratios:

Count ratios, which is a ratio of two values which are both counts. Usually the numerator is a count that is smaller than the denominator, because the numerator is tracking a subset of what the denominator is tracking. The subset being anomalously large or anomalously small could be suspicious.

Amount ratios, which is a ratio of two values which are both amounts. Like counts, the numerator amount is tracking a subset of what the denominator is tracking, and again anomalously large or small subsets could be suspicious.

Ratios of amount divided by a related count, which gives an average amount per count. The amount and count should be related, such as dividing transaction amount by transaction count.

Multiplying an entire feature by a constant should not matter to the fraud/anomaly detector. For example, a count ratio could be expressed as just a fraction, or multiplied by 100 to become a percentage. Either way is acceptable in embodiments, as the 1-class SVM algorithm performs its own internal scaling of each feature anyway.

The set of features for cashiers is completely separate from the set of features for customer accounts, since the two types of risk targets have very different data associated with them, and moreover the features for detecting anomalies in the two types of risk targets are very different. In addition, as previously discussed, the number of cashiers is vastly smaller than the number of customers, and so embodiments include relatively more features for cashiers in order to increase the cashier data volume for the SVM. Since more cashiers cannot be added, embodiments instead add more features for each cashier.

Features for Accounts

The account features (i.e., features for the aggregate customer account data) are separated into "count types."

Each count type targets a specific measurement of account or cashier activity, and each generates three features as follows:

Take the amount related to the count, and divide by the count to get a feature indicating how many dollars were associated with each instance of the activity.

Of the transactions in the count type, take the amount associated with the sales transactions and divide by the number of such transactions.

Of the transactions in the count type, take the amount associated with the returns transactions and divide by the number of such transactions The following count types generate features as described above (an example follows the list of count types):
1. Non-voided transactions.
2. Voided transactions.
3. Non-voided employee transactions.
4. Voided employee transactions.
5. Transactions where the credit card was keyed in manually.

For example, take the number of non-voided transactions, and the amount associated with those transactions. Produce the following three features:

Take the amount and divide by the count.

Take the amount associated with sales transactions of the account and divide by the number of such transactions.

Take the amount associated with returns transactions of the account and divide by the number of such transactions.

In addition, embodiments include a few account features which do not fit the above pattern. For each account:

Employee transaction rate: take the total dollar amount of transactions for an employee and divide by the total number of such transactions.

The total number of the account's transactions.

The total dollar amount of the account's transactions.

The number of different stores where the account was used.

The number of cashiers who accepted tenders on the account

The number of dates on which the account was used.

The number of days between the first use of the account and the last use.

Some of the above account features are pure counts.

Features for Cashiers

The cashier features (i.e., features for the aggregate cashier data) provides unique issues. There are a limited number of cashiers working for a retailer at any given time, whereas the number of Customer Account Cards (e.g., loyalty cards) in circulation is virtually unbounded. Typically this could be in the hundreds of thousands or even millions per retailer. Therefore, to obtain reliable models for the cashier data, embodiments need to greatly increase the number of features that are used in this model training dataset. Thus, the amount of data aggregated and fed into the SVM algorithm per cashier is increased. These features are also more complicated than the accounts features and address specific areas of known fraud.

As in the features for accounts, "count" refers to a transaction count or count of other retail-related activity and "amount" refers to monetary value. In what follows, a count or amount will always mean a count or amount specific to the cashier for which the feature is being calculated. Thus, for example, "total sales amount" refers to the total monetary value processed by the cashier, not the overall total monetary value of the entire business.

The following is not a listing of every feature that could be used to track cashier activity, but instead provides some overall categories and examples. Many of the features can have simple variants which can be derived from the examples given. For example, in the case of refunds, it is possible to track refunds in general but also possible to track specifically where the refund was given in cash, and several features would have such a cash variant.

Many of the features are generated according to the following template which compares two categories of counts. Suppose the two categories of counts are A and B. Then generate the following features:

Take the count of A divided by the count of B.

Take the amount of A divided by the amount of B.

Take the amount of A divided by the count of A, thus giving a per-instance monetary value (again these counts and amounts are specific to the cashier, and are not grand totals over the entire business).

A is generally a subset of B. Numerous examples of comparing categories are as follows.

Features related to payments by cards: "Cards" here typically includes credit cards, debit cards, and "house cards," that is, charge cards issued by the retailer itself. Generate features according to the template above:
1. A=card transactions, B=any transactions.
2. A=manually-keyed card transactions, B=card transactions.
3. A=manual authorization card transactions, B=card transactions.

In the features for cards, A and B are categories of transactions, but more generally, they can be categories of other retail-related accounting objects, as in the features below.

Features related to discounts given by cashiers:
1. Line discounts. A "line" can be thought of as a line on a receipt, typically representing the purchase of a single item.
   a. A=lines sold with discounts, B=all lines sold.
2. Price overrides performed by the cashier.
   a. A=lines sold with price overrides, B=all lines sold.

Features to detect employee self-dealing and collusion:
1. Use of employee discount by the cashier.
   a. A=units sold with employee discount, B=all units sold.
2. Sales transactions by employees for themselves (own transactions).
   a. A=sales transactions by the cashier for himself, B=all sales transactions of the cashier.
3. Transactions involving refunds or exchanges with money-out by employees for themselves.
   a. A=all such transactions, B=all transactions.

Features related to putting money on gift cards and to merchandise credits:
1. A=Lines related to issuing gift cards or issuing merchandise credits, B=all lines sold.
2. A=Lines paid by redeeming gift cards or merchandise credits, B=all lines sold.
3. A=Lines related to gift cards sold or reloaded, B=all lines sold by the cashier. (Selling or reloading a gift card appears as a line on a receipt, so we can apply the "line" terminology to gift cards.)

Feature for detecting no sales: Divide the no-sale transaction count by the total transaction count.

Features related to cash movement for refunds or for exchanges: For such features, it is important to track "money in" and "money out" amounts separately, so that they do not cancel out. The number of features unfortunately increases because of this, but it is unavoidable. These types of features are one area where numerous variants are possible to track the various combinations of money in, money out, whether it was a refund or exchange, whether cash was involved, etc. A few of the possible examples are as follows:

1. Money coming in from cash exchanges.
   a. Money-in amount divided by total amount.
   b. Money-in amount divided by money-in transaction count.
2. Money going out from cash exchanges.
   a. Money-out amount divided by total amount.
   b. Money-out amount divided by money-out transaction count.
3. Cash refunds.
   a. Cash-refund amount divided by total amount.
   b. Cash-refund amount divided by cash-refund transaction count.
   c. Cash-refund transaction count divided by refund/exchange transactions that have money out.
   d. Cash-refund transaction count divided by cash-transaction count.

Features related to refunds and exchanges in general (whether cash or otherwise):

1. A=refunds and exchange transactions with money going out, B=all transactions.
2. Amount of exchanges with money in divided by total sales.
3. Amount of exchanges with money in divided by total such transactions.
4. Amount of exchanges with money out divided by total sales.
5. Amount of exchanges with money out divided by total such transactions.

Features related to high-risk refunds: These are high risk in that they are frequently tied with fraudulent behavior.

1. Amount of same-day refunds divided by total amount.
2. Amount of same-day refunds divided by total such transactions.
3. Count of same-day refund transactions divided by all transactions with money-out refunds/exchanges.

Features related to non-merchandise sales: These are sales where no merchandise was involved, such as selling services, and can be a source of fraud since non-merchandise has no inventory.

A=non-merchandise lines, B=all lines.

Features related to cancellation of transactions or lines of a transaction: "Voiding" means cancelling a transaction or particular lines in a transaction, and can be a way to hide suspicious activity. These features track voiding:

A=lines voided, B=all lines.
A=transactions voided, B=all transaction.
A=post-voided transactions, B=all transactions. Post voiding refers to removing transactions that have already occurred.

Specificity of Models Used in Embodiments

While one embodiment uses just a single SVM for cashiers and a single SVM for customer accounts, other embodiments are more effective because they use several SVMs, each handling specific subsets of the risk targets. Embodiments partition the dataset by data range, explained below, and by groupings of stores. The SVMs within each combination of data range and store grouping are more highly tuned to what is normal behavior within the partition, and thus are less likely to falsely report fraud.

Segregation of the Modelling Dataset by Transaction Volume Ranges

To make the SVMs more sensitive to anomalies, embodiments create multiple SVMs for handling customer accounts, where each SVM handles a different transaction volume range The total transaction count feature (column "TOTAL_TRANS_COUNT_ALL") identifies whether the customer account has been used on numerous occasions or quite infrequently. This allows for the possibility that "normal" behavior may be different depending on the frequency of use. Therefore, embodiments build a model for each frequency range, training the model only on the relevant dataset: low volume, high volume or in the mid-range. The ranges may be configurable by retailer but, by default only two of the ranges are enabled and are set as follows:

1. The range from 1 to 5 number of transactions in the modelling period. A large percentage of the customer accounts may fall into this range, which represents customers who visit the retailer very infrequently, or have just visited it a few times and then never again after that.
2. The range from 6 to infinity number of transactions.

Instead of the default of 5, embodiments can also set the range by finding the number N where the accounts with TOTAL_TRANS_COUNT_ALL equal to N or above represent 85% of the dollar total of all accounts. The rationale here is that the very low-transaction-count accounts, while so numerous that they may greatly outnumber all the other accounts, represent a very low dollar amount in aggregate, and so should be separated from the rest of the accounts which represent the bulk of the dollar volume of the retailer. More sophisticated schemes are possible, but likely unnecessary, as this pattern of numerous very low-transaction-count accounts representing also a low fraction of total dollar volume is quite common among retailers. For retailers whose business is unusual enough to depart from this pattern, the ranges for accounts can be configured manually.

For the cashier data, the invention uses the total_trans_count to split the cashiers into ranges (just as accounts uses total_trans_count_all to perform the splitting). This allows for different types of cashiers, such as part time vs. full time cashiers. These ranges are highly dependent on how the retailer runs its business, and so embodiments does not provide an automatic way of setting these ranges.

Different Models for Different Stores

The grouping of stores is a configuration, and can be tailored to each individual retailer depending on the retailer's business. The groupings are set up once for each retailer, at the time when embodiments are implemented for the retailer. Some examples of common configurations:

Group the stores by store type, for example by size of store. This grouping separates out large super stores from convenience stores, for example. Many retailers have a wide variety of sizes of stores, and it is entirely possible that normal, non-outlier behavior is different in the different sizes of stores.

Group the stores by country. Large retailers may have operations in several countries, and business practices may differ by country.

Within a country, group the stores by region. Again, it is possible that business practices may differ by region if the country is large enough.

To support store groupings, the aggregations described above for producing account-level and cashier-level data is done per grouping. For example, it is possible, though unlikely, that a cashier worked in two different store groupings, in which case the cashier would be represented by two separate aggregations, one in each grouping. Similarly, if a single customer account had data from two different groupings, each grouping would receive its own separate aggregation of the customer account. Within the data for each grouping, embodiments then apply the data ranges discussed above.

Data Range-Store Grouping Partition

Embodiments creates one SVM per combination of data range and store grouping. Such a combination is called a "data partition" or just "partition." For example, the combination of the range 6-to-infinity within the Western US region receives its own SVM, created only on data contained in that partition.

Handling Different Currencies

For columns that involve a monetary amount, embodiments scale them according to current exchange rates. Embodiments can choose a base currency, for example the U.S. dollar, and then convert all amounts from local currencies into U.S. dollars. With all amounts and amount-related averages expressed in the same currency, separate models are not needed for different currencies, and the retailer is free to group stores from different countries together if that seems proper. Otherwise the retailer would be forced to create different models for different countries, a needless inflexibility.

The conversion to a common base currency occurs in the process of creating the aggregations for cashiers and accounts. The code to perform the aggregation also handles the currency conversion.

Embodiments include the flexibility to train and apply each model for each individual currency AND/OR all currencies converted to base currency. For example, if a customer has a base currency of dollars (USD) but also trades in Canadian dollars (CAD) and Euros (EUR). The model can be configured/enabled to run for CAD, USD and EUR transactions separately. It can also be configured/enabled to run for all the CAD, USD and EUR transactions converted to base currency (USD). Individual currencies can also be disabled (e.g., there is no need to include/model EUR transactions separately at all).

Further, for example, if an ACCOUNT CARD was used for USD and CAD transactions, the aggregated totals could contain 3 records for that ACCOUNT ID:
  BC/USD record: USD and CAD transaction converted to USD (Base Currency);
  CC/USD record: Just the transactions for Currency Code USD;
  CC/CAD record: Just the transactions for Currency Code CAD.
Any of these configurations can be enabled/disabled as required or if deemed to be sensible.

Applying the SVMs

Embodiments apply the SVMs by use the 1-class SVMs disclosed above to detect anomalies after creating them. In embodiments, the SVMs are run on all available risk targets.

Data Partitions

As disclosed above, the data aggregation for creating the risk targets performs aggregations within each store grouping, so that each grouping has its own set of risk targets. Applying the correct SVM to each risk target is then a matter of determining which data range it falls into.

Anomaly Score 1-class SVMs return a score between 0 and 1 to indicate the degree of anomaly of the risk target, with scores closer to 1 indicating higher anomaly. For example, in the Oracle Advanced Analytics software that is part of the Oracle database, the 1-class SVM produces a "prediction_probability" score.

The models should be applied to all available risk targets, including the ones that were used as the training set.

Display of Anomaly Information

In embodiments, a UI displays anomaly information in at least these three ways:
  Flag the "most anomalous" accounts, where "most anomalous" means the anomaly score described above is at least 80. The 80 should be a configuration point, with 80 as the default.
  Sort by the score, so that the user can sort from highest to lowest.
  Flag the top N "most anomalous" accounts. This means after sorting, flag the top N risk targets as anomalous.
  Provide a global display of the above over all partitions, and then allow drilling into each partition.

In addition to the anomaly score for a risk target, the UI also shows what features contributed to the anomaly score, as an explanation of why a risk target received the score that it did. Most 1-class SVM implementations, such as the one in Oracle Advanced Analytics, can produce for each risk target a numerical weight indicating how strongly each feature contributed to the fraud score of the risk target. Because the number of features can be large, the display of the weight can be confined to just the top N most heavily weighted features. Investigators of a risk target can use the weights to determine what to examine first, rather than having to investigate all aspects of the risk target.

Using Random Forests

Embodiments disclosed above, using the 1-class SVM, detects anomalies without any identification of which risk targets are fraudulent. Supervised approaches, such as random forests, require training data, which is a set of risk targets that are labeled as fraud or not fraud. While supervised approaches may provide more accuracy, since they learn based on risk targets truly known to be fraudulent or not fraudulent, they only provide that accuracy if the training data itself is accurate and numerous. In retail, identifying fraudulent risk targets requires a large human effort, since investigation is not a simple or quick task, and thus accumulating sufficient training data may be problematic for many retailers. On the other hand, if a retailer is able to perform enough investigation, then using random forests could be more accurate than the SVM. Therefore, embodiments offers both approaches, to be compatible with as many retailers as possible. Further, embodiments can use the SVM to help train the random forests, as disclosed below, so in that embodiment both approaches can be combined.

In other domains where machine learning is applied, the cost of labeling may require much less human effort and thus an extensive labeled training set is easier to produce. Thus, in part, embodiments are directed to employing a supervised approach like random forests when an extensive labeled training set might not be available.

The Training Data for the Random Forests

Each risk target includes a number of features, whose calculation is disclosed above. For random forest embodiments, these same features are used, but three additional features are added to each target:
1. The fraud/not fraud feature. This feature is not a calculated feature but must be filled in by manual effort, based on investigation of the risk target. This feature can have three possible values: Fraud, Not Fraud, and Unknown. "Fraud" means "investigation has determined that this risk target is fraudulent;" "Not fraud" means "investigation has determined that this risk target is not fraudulent;" and "Unknown" means "this risk target was not investigated or is otherwise indeterminate." Likely the vast majority of risk targets will be simply "Unknown," due to the effort which investigation requires. This feature will actually undergo modification before training, as disclosed below.
2. The store grouping. As discussed above, the risk targets are partitioned by store grouping. Thus, to each risk target, which store grouping the risk target is from is added.
3. The data range. The risk targets are also partitioned by data range. For accounts the data range is based on total_trans_count_all, whereas for cashier targets, the range is based on total_trans_count and the respective date range is added as a feature.

Instead of using a random forest per data partition, as with SVMs, embodiments use only two random forests, one for all customer accounts, and one for all cashiers. However, the store grouping and the data range are fed as features into each random forest, and in this way the single random forest can account for the data partition of the risk target. In general, this method likely would not work with SVMs, because it would affect the anomaly determination that the SVM makes.

Embodiments avoid creating separate random forest instances for each data partition, because that would greatly increase the requirement for labeled training data. It would be necessary to have sufficient labeled training data for each partition, which most retailers would be unlikely to have. The three additional features described above should not be fed to the SVMs. They are for the random forests only.

Compiling the Training Data for the Random Forests

As disclosed above, the training data set can be very small, and worse, the training set is likely to be quite unbalanced, in that it may contain more cases of fraud than not fraud simply because the retailer is only likely to investigate risk targets that are suspicious to begin with. For example, it is even likely that the training set contains only fraudulent risk targets. Such an unbalanced training set can affect the training of the random forest (or any other supervised machine learning technique), and so to counter the effects of that, especially of the case where the training set contains only fraudulent risk targets, risk targets that are considered non-anomalous by the SVM are added to the training set. Therefore, the training set includes of the following:

1. Risk targets marked as Fraud.
2. Risk targets marked as Not Fraud.
3. Non-anomalous risk targets, defined as ones with an SVM anomaly score of 50 or below (recall the anomaly score from the SVM goes from 0 to 100). For these risk targets, set the Fraud/Not Fraud feature to Not Fraud.

Therefore, embodiments employ all three types of commonly-used fraud-detection techniques: rules, unsupervised learning, and supervised learning. Moreover, rules are used to help train the unsupervised learning, and then the unsupervised learning in its turn is used to help train the supervised learning.

Output of the Random Forest

Most implementations of random forest, such as the one implemented by Oracle Advanced Analytics, will produce the same outputs as described above for the SVM. In the case of the random forest, the anomaly score is replaced by a "probability of fraud," though the use of both to the user is the same. Thus, for each risk target, embodiments have an output from the SVM and one from the random forest. The UIs, for each risk target, display the output of both the SVM and the random forest, and the user should investigate those risk targets where either score is above 80.

Figure 3:
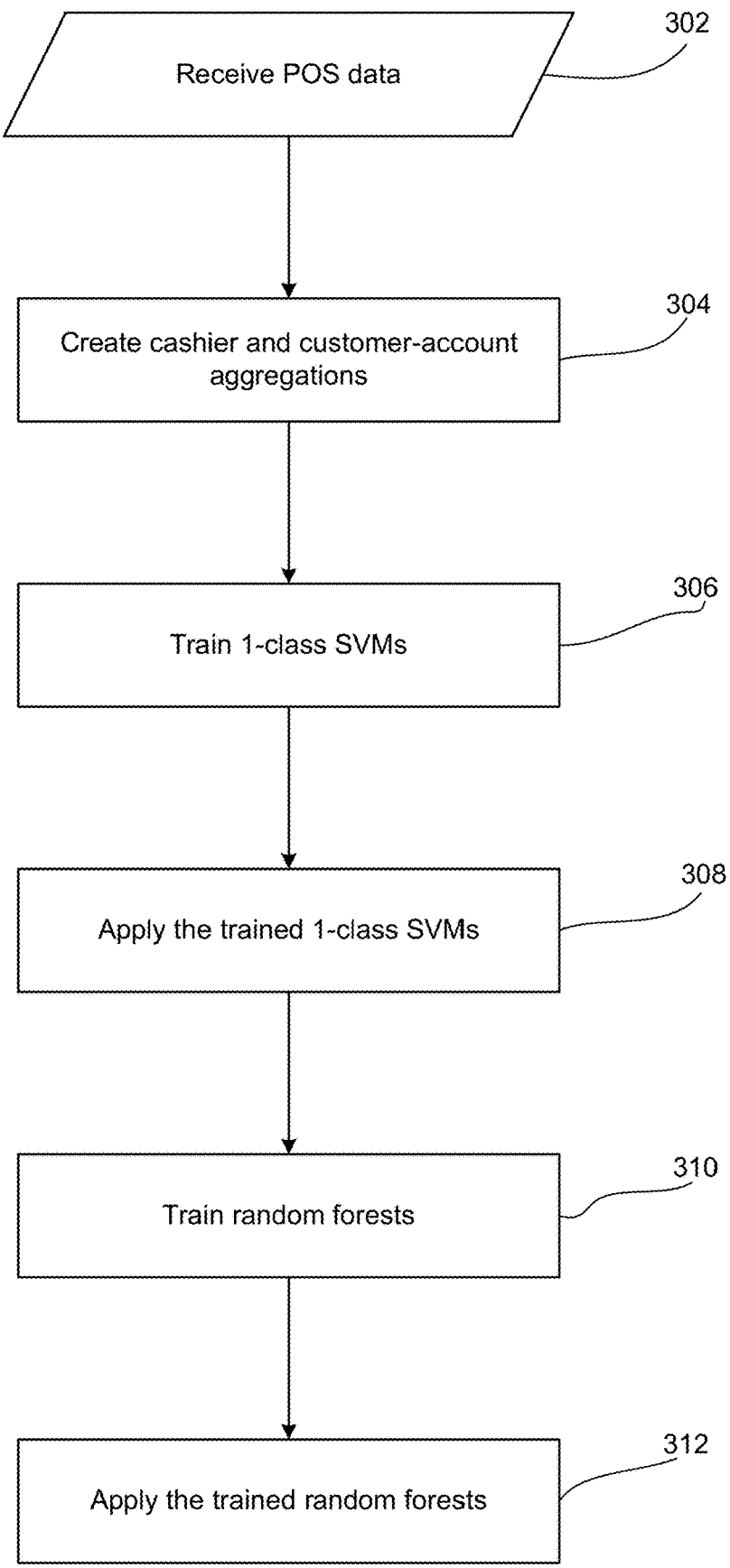
FIG. 3 is a block diagram and flow diagram that illustrates the functionality of AI based fraud detection in accordance to embodiments.

FIG. 3 is a block diagram and flow diagram that illustrates the functionality of AI based fraud detection in accordance to embodiments. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, point-of-sale data from multiple POSs 99 for a retailer is received. Details of the POS data received at 302 is disclosed below.

At 304, separate cashier and customer-account aggregations for the last 90 days of data (or other pre-defined time durations) are created. The creation includes performing currency conversions. The creation further includes dividing the data according to the store groupings, and within each grouping, creating customer-account and cashier aggregations (i.e., the "risk targets"). Further, the creation includes calculating the features, which are specific for the cashier or customer-account data.

At 306, the 1-class SVMs are trained. The training includes filtering the risk targets using the filtering rules disclosed below. The training further includes separating the risk targets by data range, as disclosed above. For each combination of data range/store grouping, a 1-class SVM is trained at 306. Other types of unsupervised machine learning models besides 1-class SVMs may be used in other embodiments, such as clustering (i.e., the non-fraudulent behavior would form large clusters, and the fraudulent behavior could be detected because it would be in small clusters that were distant from the large clusters).

At 308, the trained 1-class SVMs are applied after the training at 306. The applying includes separating all the risk targets by data range. The risk targets are not filtered with the rules. The applying further includes collecting together the anomaly scores and feature weights for display in a UI.

At 310, the random forests are trained. The training includes collect together the data disclosed above to produce the training data for the random forests. Only two random forests are trained, one for customer accounts and one for cashiers, but the store groupings and data ranges are included as features. Other types of supervised models can be used besides random forests in other embodiments, including neural networks.

At 312, the trained random forests from 310 are applied. The applying is the same functionality as with 308 except the random forests are used instead of SVMs.

In embodiments, the frequency of training the SVMs at 306 can actually be less than the frequency of running the other steps, meaning it is not necessary to constantly train new SVMs. Skipping 306 means that 308 will be run with whatever SVMs are currently available. It is possible that delaying 306 will result in running very old SVMs, which may not be desirable either. In embodiments, the frequency of running 306 is configurable, with a default of running every 30 days.

The efficiency of 308 can be improved by avoiding running SVMs on a risk target if it has not changed since the last time it was evaluated by the SVM. If a risk target has not changed, and the SVMs have not been retrained, then the answers given at 308 will be the same and so there is no point in running the risk target through the SVM. Similarly, this applies to 312.

Filtering Rules

In embodiments, filtering rules are used for filtering the data given to the SVMs. Each has configurable thresholds for counts of transactions and/or transaction values. Typically these will focus on the following categories of fraud:

Cashier Risk Target

Pass Off Risk
Discounting items at line or transaction level.
Overriding selling prices.
Voiding or cancelling transaction items.
Sales values under normal trading thresholds (e.g., an expensive item on a low value barcode).
Post-voiding transactions.
Cash Theft Risks
Transactions post voided involving cash.
Suspending transactions.
Training transactions.
No Match transactions, missing reference to previous related transaction.
Refunds Risks
Refund/exchanges with no original receipt.
Refund/exchanges with money out of the business.
Refund/exchanges with no original receipt and money out.
Refund/exchanges with unverified values.
Refund/exchanges on the same day as the original transaction.
Cash Refunds Risks (High Risk)
Most of the previous Refunds Risk with CASH money out or unverified.
Percentage of refunds involving cash out.
Cash refunds on the same day.
Cash refunds for a single SKU.
Total cash refund volumes.
Total cash transaction amounts.
Unusual Transaction Volumes
Total Sales amount.
Total number of sales.
Total transaction counts.

The above are some of the most significant risk factors, although in some embodiments approximately 250 metrics are summarized for each store cashier on a daily basis in a statistics table. Additional filter rules are also applied where a company employee is identified in transactions.

Account Risk Target (Credit/Debit Card Activity)

Large Purchases
Including Gift Card or Certificate purchases.
Average amount per transaction.
Multiple Transactions.
Same day, same store transactions (large time gap).
Same day, in multiple stores.
Manually keyed account numbers, multiples.
Refunds
Employee refunds against non-employee transactions.
Refunds compared to sales, large amount or percentage of.
Same store compared to multiple stores.
Account Risk Target (Gift Cards, Credit Notes and Certificates) Issuances (Internal/External)
Purchases on Credit Card.
Low average amount per transaction, multiple transactions.
Same day transactions and multiple redemptions in same store.
Same store, multiple redemptions.
Refunds
Employee refunds against non-employee transactions.
Refunds compared to sales, large amount or percentage of.
Same store compared to multiple stores.

Description of Point-of-Sale Data

In embodiments, POS data received from POSs 99 is received as standard POSLog formatted XML data in real time or overnight in batched files. The ETL procedures analyze the point of sale data and store transaction details and other summarized or derived elements.

Transaction Header details:
Transaction ID: Date, Time and Duration, Store, Register, Transaction number.
Cashier ID: Unique identifier for the CASHIER risk target.
Transaction Type: Sale, Return.
Transaction Status: Complete, Cancelled, Training.
Employee ID: flagged for own employee transactions.
Customer/Loyalty ID: where customer details are recorded.
Transaction value summary: Totals, Discounts, Overrides, Voids, Cash.
Transaction Currency.
Flags: Indicators for various events flagged up in the ETL.
Authorization and Reason Codes entered.
Items Sold or Returned:
Transaction Type: Sale, Return, Exchange, Payment, Post Voided.
Transaction Status: Complete, Cancelled, Post Voided, Incomplete, Suspended.
Item details: SKU, Barcode, Description, Selling Price, Quantity Sold.
Line value summary: Sales Value, Discounts, Price Overrides, Tax.

Flags: Voided, Matched, Return verified, Gift Receipt issued.
Authorization and Return Reason Codes entered.
Original transaction item link details.
Discounts:
Transaction Type: Sale, Return, Exchange, Post Voided.
Transaction Status: Complete, Cancelled, Post Voided, Incomplete, Suspended.
Line value summary: Discount Values
Flags: Voided
Authorization and Discount Type/Reason Codes entered
Tenders:
Transaction Type: Sale, Return, Exchange, Post Voided, Petty Cash, etc.
Tender Type: Cash, Check, Credit/Debit Card, Gift Card, etc.
Account Card details: Card Number, Masked PAN, Card Hash value.
Transaction Status: Complete, Cancelled, Post Voided, Incomplete, Suspended.
Tender value summary: Tender Amount, Foreign Currency Amount.
Currency Code, Foreign Currency Code and Exchange Rate.
Flags: Voided.
Authorization Codes captured/entered.
Risk Type: Customer Accounts
Point of sale account card tenders are analyzed over the last 90 days and values are aggregated to provide the metrics required by the 1-class SVM model. A single record for each unique account card is then prepared for the model data feed. In addition to aggregated values, the data source also contains details of patterns of card usage by store and by date.
Risk Type: Cashier
For historical reporting and fraud detection purposes, in embodiments, over 250 metrics were derived and aggregated for each cashier, for each trading day, on a STATISTICS table. A selection of the most significant metrics from this data source were aggregated over the past 90 days and a single record created for each cashier. The data passed to the 1-class SVM model contains various calculated average and percentage values as described elsewhere in this document.

Figure 4:
FIG. 4 is a screenshot of a user interface for customer account fraud detection in accordance to embodiments.

FIG. 4 is a screenshot 400 of a user interface for customer account fraud detection in accordance to embodiments. At 402, customer accounts are listed and ranked by descending order of probability of fraud.

Figure 5:
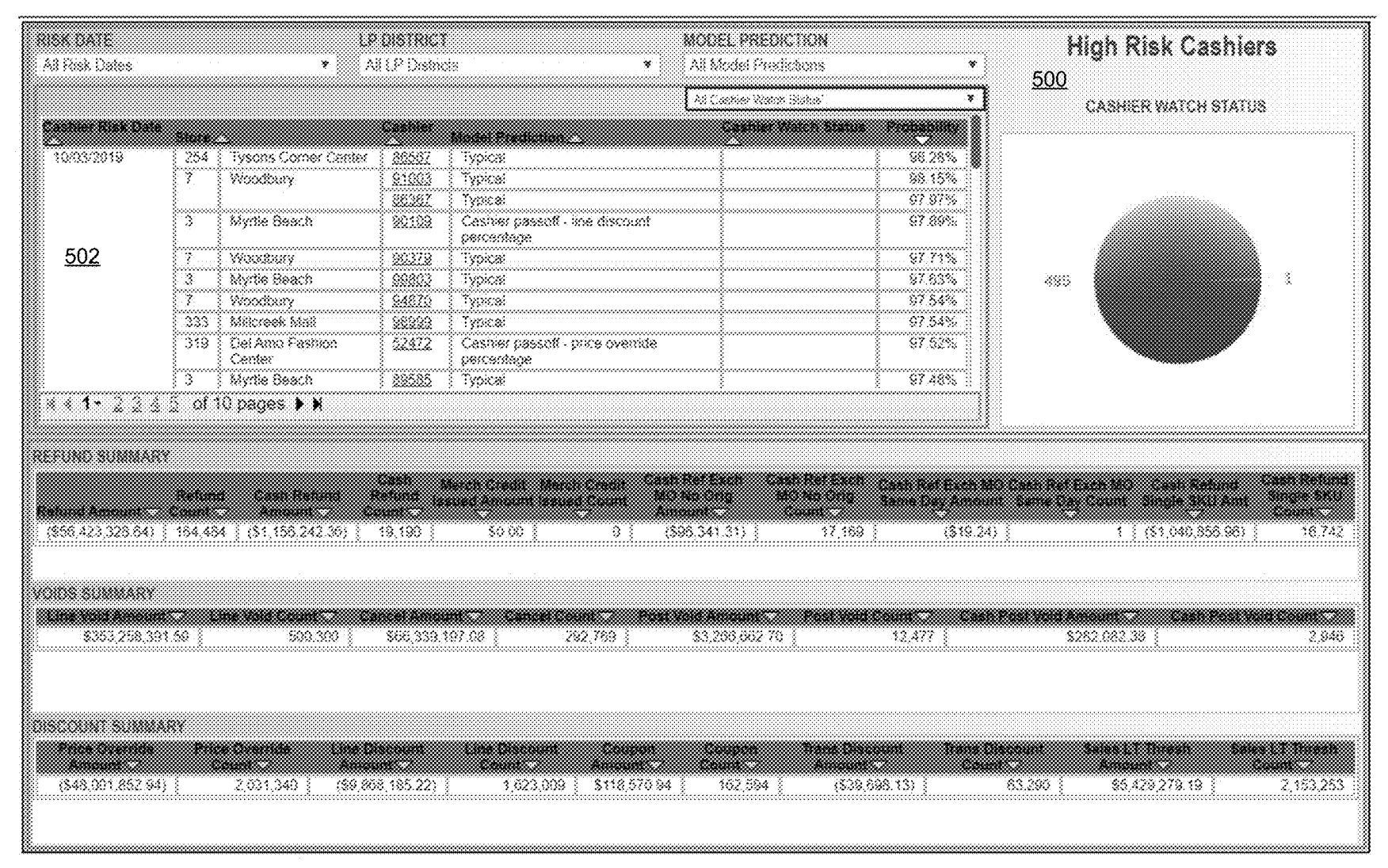

FIG. 5 is a screenshot 500 of a user interface for cashier fraud detection in accordance to embodiments. At 502, specific cashiers are listed and ranked by descending order of probability of fraud.

SVMs

In general, a Support Vector Machine ("SVM") is a classic machine learning algorithm that normally is a supervised approach. For fraud detection, the standard SVM would indeed divide cases into two classes, fraud and not fraud, but only after it has been given a number of instances of each, where the instances were determined by human effort to be fraud or not fraud. This is the feedback discussed above that supervised approaches require. However, the "1-class SVM," does not require feedback, and is a true unsupervised approach. In this use of SVM, it becomes a detector of outliers/anomalies (i.e., unusual cases). The outliers are then the cases which, because of their outlier nature, are possibly the result of fraudulent activity. The implicit assumption is that the vast majority of cases are not fraudulent, and thus it is the deviations from normal that are suspicious.

Figure 6:
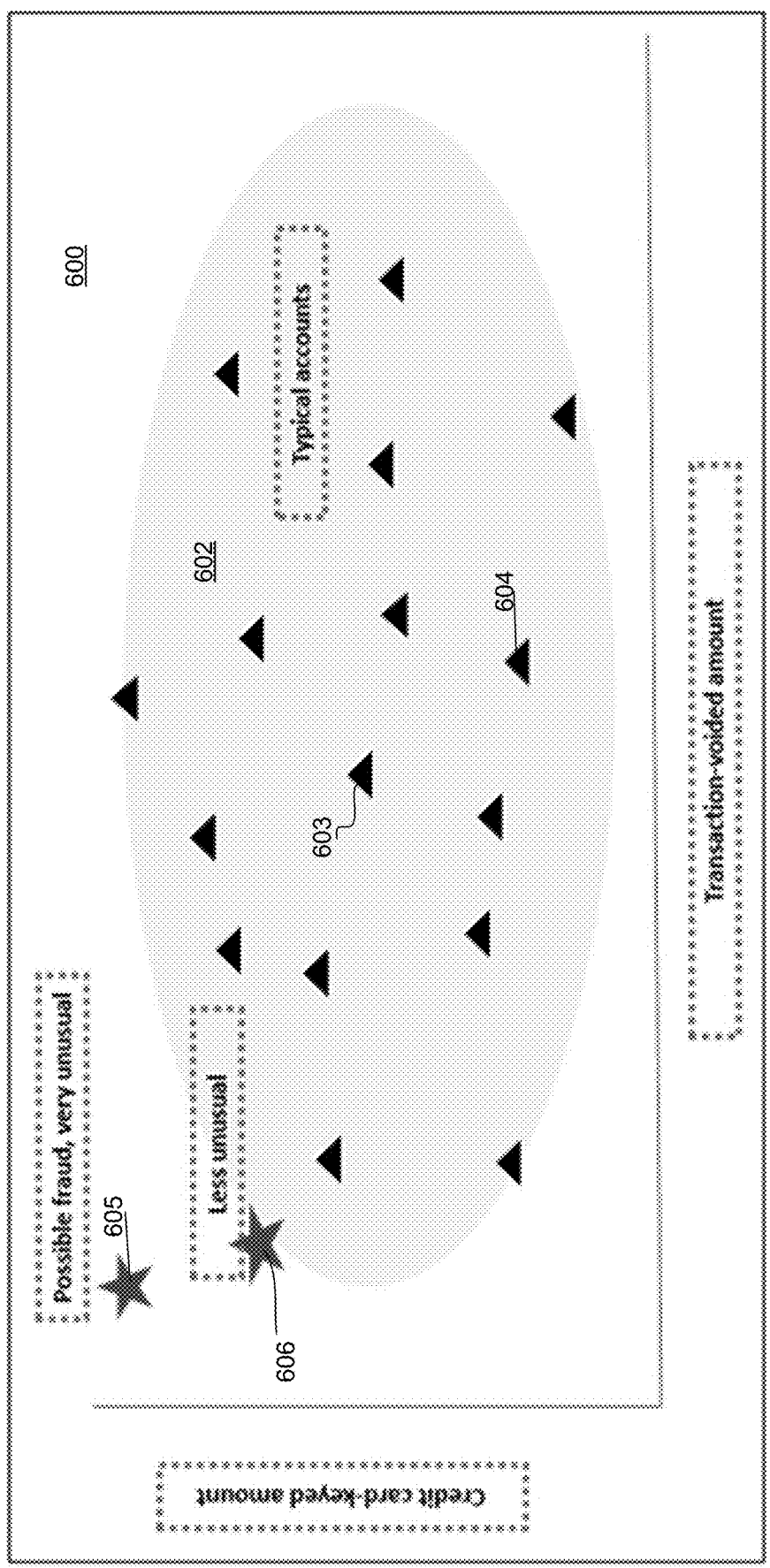
FIG. 6 is a graph that illustrates the use of a 1-class SVM as an anomaly detector in accordance to embodiments.

FIG. 6 is a graph 600 that illustrates the use of a 1-class SVM as an anomaly detector in accordance to embodiments. In FIG. 6, which is a simplified example, customer accounts are measured along only two dimensions, namely transaction-voided dollar amounts, and credit-card-keyed dollar amounts. In contrast, embodiments of the invention utilize hundreds of such dimensions. Given all of the accounts as input, the 1-class SVM identifies an ellipse region 602 which contains a large majority of the accounts. Each black triangle (e.g., triangles 603, 604) represents a customer account, and the ones that are well within region 602 are normal behavior because there are so many of them. However, accounts which are closer to region 602, or actually over the boundary and outside region 602, are anomalies with respect to the majority of the accounts, and are thus given a high "anomaly score." These are the stars 605, 606. Thus, the 1-class SVM produces a score between 0 and 100 for each account, indicating how close the account is to the boundary of region 602, with scores closer to 100 indicating an account that is closer to the boundary or even over the boundary (which would generate a very high score).

As disclosed, embodiments use multiple SVMs and random forests based AI in order to detect fraud among customer accounts and cashiers. Embodiments utilize features that are specific for the customer accounts or for cashiers. Embodiments avoid the problems of having to deal with the typically large number of uninvestigated customer accounts or cashiers which are caused by applying supervised techniques (e.g., random forests) which require a human-labeled training set, and in the case of fraud, coming up with that training set is a large investment of effort. Instead, embodiments use the SVMs to generate the training set. Further, embodiments use specific SVMs for particular data ranges, and incorporate data ranges into random forests without using multiple random forests.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of detecting fraud of risk targets, the risk targets comprising customer accounts and cashiers, the method comprising:
 receiving historical point of sale (POS) data;
 dividing the POS data into store groupings;
 creating a first aggregation of the POS data corresponding to the customer accounts and a second aggregation of the POS data corresponding to the cashiers;
 calculating first features corresponding to the customer accounts and second features corresponding to the cashiers;
 filtering the first aggregation and the second aggregation based on filtering rules, the filtering rules comprising thresholds for counts of transactions and/or transaction values;
 separating the filtered first aggregation and the second aggregation into a plurality of data ranges;
 for each combination of store groupings and data ranges, training an unsupervised machine learning models;
 applying the unsupervised machine learning models after the training to generate first anomaly scores for each of the customer accounts and cashiers; and based on the first anomaly scores, outputting information identifying likely fraudulent risk targets.

2. The method of claim 1, further comprising:
training a first supervised machine learning model for the customer accounts and a second supervised machine learning model for the cashiers, wherein the training comprises using the store groupings and data ranges as third features in addition to the first features and the second features;
applying the supervised machine learning models after the training to generate second anomaly scores for each of the customer accounts and cashiers.

3. The method of claim 2, wherein the unsupervised machine learning models each comprise a 1-class support vector machine and the first supervised machine learning model and the second supervised machine learning model each comprise random forests.

4. The method of claim 1, wherein activity of each customer account is generated by a loyalty account.

5. The method of claim 1, wherein activity of each of the cashiers is tracked by one or more corresponding POS systems.

6. The method of claim 1, wherein the first features and the second features each comprise count ratios, amount ratios, and ratios of an amount divided by a corresponding count.

7. The method of claim 1, wherein the outputting information comprises:
generating a user interface that displays a listing of a most likely fraudulent customer accounts and cashiers and a numerical weight indicating how strongly each feature contributed to the first anomaly scores.

8. A non-transitory computer-readable medium storing instructions which, when executed by at least one of a plurality of processors, cause the processor to detect fraud of risk targets, the risk targets comprising customer accounts and cashiers, the detecting comprising:
receiving historical point of sale (POS) data;
dividing the POS data into store groupings;
creating a first aggregation of the POS data corresponding to the customer accounts and a second aggregation of the POS data corresponding to the cashiers;
calculating first features corresponding to the customer accounts and second features corresponding to the cashiers;
filtering the first aggregation and the second aggregation based on filtering rules, the filtering rules comprising thresholds for counts of transactions and/or transaction values;
separating the filtered first aggregation and the second aggregation into a plurality of data ranges;
for each combination of store groupings and data ranges, training an unsupervised machine learning models;
applying the unsupervised machine learning models after the training to generate first anomaly scores for each of the customer accounts and cashiers; and
based on the first anomaly scores, outputting information identifying likely fraudulent risk targets.

9. The computer-readable medium of claim 8, the detecting further comprising:
training a first supervised machine learning model for the customer accounts and a second supervised machine learning model for the cashiers, wherein the training comprises using the store groupings and data ranges as third features in addition to the first features and the second features;
applying the supervised machine learning models after the training to generate second anomaly scores for each of the customer accounts and cashiers.

10. The computer-readable medium of claim 9, wherein the unsupervised machine learning models each comprise a 1-class support vector machine and the first supervised machine learning model and the second supervised machine learning model each comprise random forests.

11. The computer-readable medium of claim 8, wherein activity of each customer account is generated by a loyalty account.

12. The computer-readable medium of claim 8, wherein activity of each of the cashiers is tracked by one or more corresponding POS systems.

13. The computer-readable medium of claim 8, wherein the first features and the second features each comprise count ratios, amount ratios, and ratios of an amount divided by a corresponding count.

14. The computer-readable medium of claim 8, wherein the outputting information comprises:
generating a user interface that displays a listing of a most likely fraudulent customer accounts and cashiers and a numerical weight indicating how strongly each feature contributed to the first anomaly scores.

15. A fraud detection system for detecting fraud of risk targets, the risk targets comprising customer accounts and cashiers, the system comprising:
one or more processors executing instructions;
historical point of sale (POS) data received by the processors; and
a plurality of unsupervised machine learning models;
the processors configured to:
divide the POS data into store groupings;
create a first aggregation of the POS data corresponding to the customer accounts and a second aggregation of the POS data corresponding to the cashiers;
calculate first features corresponding to the customer accounts and second features corresponding to the cashiers;
filter the first aggregation and the second aggregation based on filtering rules, the filtering rules comprising thresholds for counts of transactions and/or transaction values;
separate the filtered first aggregation and the second aggregation into a plurality of data ranges;
for each combination of store groupings and data ranges, train the unsupervised machine learning models;
apply the unsupervised machine learning models after the training to generate first anomaly scores for each of the customer accounts and cashiers; and
based on the first anomaly scores, output information identifying likely fraudulent risk targets.

16. The system of claim 15, further comprising:
a first supervised machine learning model for the customer accounts;
a second supervised machine learning model for the cashiers:
the processors further configured to:
train the first supervised machine learning model for the customer accounts and the second supervised machine learning model for the cashiers, wherein the training comprises using the store groupings and data ranges as third features in addition to the first features and the second features;

apply the supervised machine learning models after the training to generate second anomaly scores for each of the customer accounts and cashiers.

17. The system of claim 16, wherein the unsupervised machine learning models each comprise a 1-class support vector machine and the first supervised machine learning model and the second supervised machine learning model each comprise random forests.

18. The system of claim 15, wherein activity of each customer account is generated by a loyalty account.

19. The system of claim 15, wherein activity of each of the cashiers is tracked by one or more corresponding POS systems.

20. The system of claim 15, the processors further configured to:
   generate a user interface that displays a listing of a most likely fraudulent customer accounts and cashiers and a numerical weight indicating how strongly each feature contributed to the first anomaly scores.

* * * * *